Dec. 12, 1950 — R. SYBENGA — 2,533,849
MEAT TENDERIZER
Filed Aug. 13, 1947
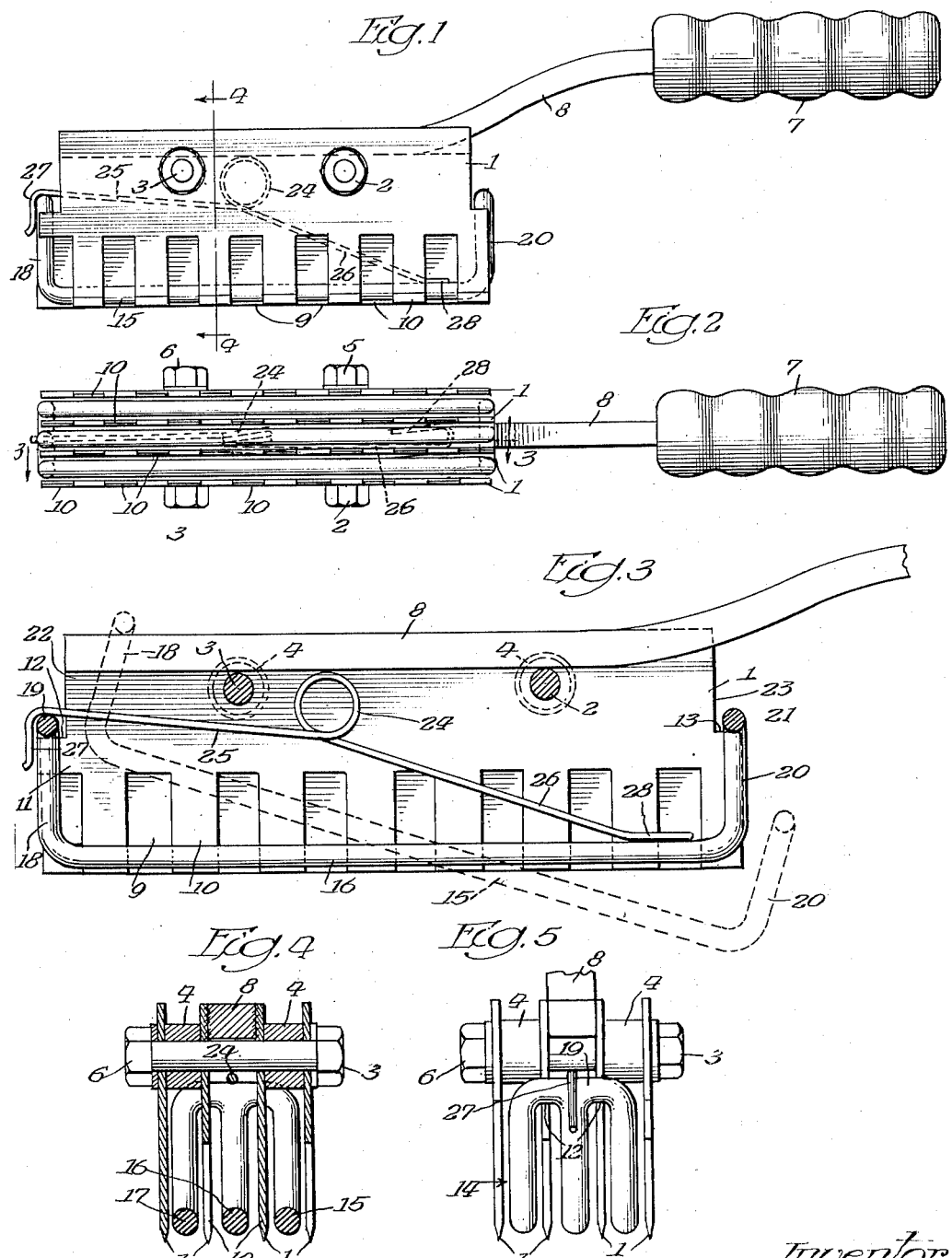
Inventor
Richard Sybenga
By: Spencer, Marzall, Johnston & Cook
Attys

Patented Dec. 12, 1950  2,533,849

UNITED STATES PATENT OFFICE 2,533,849

MEAT TENDERIZER

Richard Sybenga, Chicago, Ill.

Application August 13, 1947, Serial No. 768,400

11 Claims. (Cl. 17—30)

This invention relates in general to meat tenderizers and is particularly directed to a novel form of a hand tenderizer which may be manually used to pound and break up the meat fibers for rendering the meat more tender.

Meat tenderizers for hand operation have been known heretofore, but all of these devices have had certain disadvantages, mainly with respect to the maintenance of the device in a sanitary condition. It is, therefore, an important object of the present invention to provide a meat tenderizer which is simple in construction and easy to disassemble and reassemble for cleaning purposes.

Another object of the invention is to provide a meat tenderizer wherein a plurality of blades are secured together in spaced relation and a removable stripper is located for movement between the blades in such a manner as to effectively strip the meat from the blades and yet which may be easily and quickly removed from the blades for cleaning.

A further object of the invention is to provide a meat tenderizer having a plurality of blades secured together in spaced relation and wherein a stripper is removably mounted between the blades. A novel form of yieldable means is provided which acts in the dual capacity of retaining the stripper in place and yet allowing a relative movement between the stripper and the blades.

Still another object of the invention is the provision of integral retaining means at each end of the spaced apart blades of a meat tenderizer, which retaining means act to support the stripper and limit the outward movement thereof. Yieldable means are also provided to normally urge the stripper against the retaining means. The yieldable means may be completely removed from the device to thereby allow removal of the stripper.

Still another and more specific object of the invention is to provide a meat tenderizer wherein a plurality of blades are secured together in spaced relation. A stripper member is mounted for movement between the blades and is retained in place by the cooperation of shoulders at each end of the blades and a novel form of retaining spring.

Other objects and advantages of the invention will become apparent upon reading the following description taken in conjunction with the accompanying drawing in which:

Fig. 1 is a side elevational view of the meat tenderizer embodying the present invention;

Fig. 2 is an end-plan view of the meat tenderizer shown in Fig. 1;

Fig. 3 is a somewhat enlarged fragmentary longitudinal sectional view taken substantially along the plane of line 3—3 of Fig. 2;

Fig. 4 is a vertical transverse sectional view taken substantially along the plane of line 4—4 of Fig. 1; and Fig. 5 is an end elevational view looking toward the right in Fig. 1.

Meat tenderizers of the general type disclosed herein and which have been known heretofore, have had the disadvantage of being difficult to disassemble for cleaning purposes and to then reassemble. It has been customary in the past to so construct these devices that it becomes necessary to remove screws, nuts, or bolts to disassemble the device for cleaning. This has proven unsatisfactory in that it is usually necessary to utilize a screw driver or wrench for disassembling and, if such a tool is not handy, the cleaning of the device may be postponed indefinitely. This eventually leads to an unsanitary condition.

These and other disadvantages inherent in earlier devices of this character have been overcome by the present invention which utilizes a novel form of mounting means for the stripper and permits the stripper to be disengaged and removed from the device simply and quickly, without the aid of any tools, or the removal of any nuts, wing nuts, screws or bolts, or any fastening means.

Referring now more particularly to the drawing, the meat tenderizer of the present invention has been illustrated as having four blades indicated by the numeral 1 which are fastened or secured together in spaced relation by means of the bolts 2 and 3. These bolts extend through spacers 4 located between the blades 1. The blades are then secured in spaced relation by means of the nuts 5 and 6. While four blades have been shown, it will be understood that the number of blades may be varied to suit individual requirements. For example, a lesser number may be used such as two or three blades, or a greater number such as six or eight blades may be used. The underlying principle of the invention remains the same regardless of the number of blades, and the only change in construction would be that the bolts 2 and 3 would have to be longer or shorter and the stripper would have to be wider or narrower than illustrated.

A handle 7 is provided with a shank 8 which extends longitudinally of and between the centrally located intermediate blades, as shown, or may be provided with enlarged portions (not shown) and be secured in place by means of the bolts 2 and 3 if so desired. In the present instance, the shank 8 is illustrated as being welded to the two intermediate blades.

Each of the blades 1 has a plurality of recesses 9 extending upwardly from the lower edge thereof, which thereupon provide a plurality of spaced apart prongs or tines 10. These tines 10 are preferably alternated with respect to the adjacent blades as more clearly illustrated in Fig. 2.

The two intermediate blades 1 are provided with suitable retaining means for retaining the stripper. To accomplish this, one of the intermediate blades is illustrated in elevation in Fig. 3 where it will be seen that the forward vertical edge thereof is provided with an outward extension 11 thus providing a shoulder 12. The rear vertical edge of the same blade is also constructed so as to provide a similar shoulder 13 in substantially the same horizontal plane as the shoulder 12 at the front edge of the blade. Similar shoulders are provided at the forward edge of the adjacent intermediate blade as shown at 12 in Fig. 5, and another shoulder 13 is also provided at the rear vertical edge of the same blade.

The stripper, generally indicated by the numeral 14, includes a plurality of longitudinal rods or bars 15, 16 and 17. The number of these bars will depend upon the number of blades in the device, one being provided for each space between the blades. Thus, in a four-bladed device as illustrated, there will be three spaces between the blades necessitating a stripper having three such bars. Each of the bars 15, 16 and 17 is turned upwardly at its forward end as at 18, the up-turned ends being connected together by means of a cross member 19. Likewise, the rear ends of the bars 15, 16 and 17 are up-turned as at 20 and are connected together by means of a cross member 21.

When in assembled position, the forward cross member 19 rests on the shoulders 12 at the forward vertical edge of the intermediate blades, and the rear connecting cross member 21 rests upon the shoulders 13 at the rear vertical edges of the intermediate blades. In this position of the stripper, it can not be removed and it will have only a slight longitudinal movement. Any such movement of the stripper will be limited by the vertical edges 22 and 23 at the forward and rear edges respectively of the intermediate blades.

The novel form of yieldable retaining means which has been designed particularly for use in connection with the present invention includes a coil of spring wire 24 which terminates in outwardly extending end portions. These end portions extend in opposite directions, the end portion 25 extending forwardly and the end portion 26 extending rearwardly. The forward end of the extension 25 bears downwardly against the front connecting cross member 19 and is preferably bent downwardly as at 27 to not only prevent a rearward longitudinal movement of the spring, but also to provide a means for grasping the spring to remove it entirely from the device. The rearwardly extending end portion 26 of the spring preferably terminates in a flattened loop 28 which bears downwardly against the center bar 16 at the rear thereof. The coil 24 will thereupon bear upwardly against the underside of the shank 8. Thus it will be evident that the spring acts as a retainer for normally urging the stripper downwardly against the shoulders 12 and 13, while at the same time permitting a limited up or inward movement of the stripper at the moment the meat is struck.

It has been stated hereinabove that one of the chief advantages of the present invention is the ease and speed with which the device may be disassembled for cleaning purposes. In order to disassemble the device it is merely necessary first to remove the spring by grasping the downturned front end portion thereof to flex the coil 24 downwardly and allow it to move forwardly past the bolt 3. The stripper 14 will then be free to move upwardly or inwardly to its position shown in dotted lines in Fig. 3. In this position the forward connecting cross member 19 will clear the upper forward edge of the intermediate blades, whereupon the stripper may be moved rearwardly so that the rear connecting cross member 21 will clear the shoulders 13. From the dotted line position of the stripper 14 it will be free to move forwardly and then to be completely removed from the device. This entire operation of removing both the spring and stripper consumes a matter of a few seconds. The blades and stripper may then be placed under running water or in a suitable cleaning solution and the spaces between the blades will be entirely free from any other mechanism to permit easy cleaning.

In reassembling the device, the stripper 14 is initially placed between the blades in the position shown in dotted lines in Fig. 3. From this position the rear end of the stripper is moved upwardly and then forwardly, whereupon the rear connecting cross member 21 will come to rest on the rear shoulders 13, and the forward connecting cross member 19 will come to rest on the forward shoulders 12. The spring may then be inserted by placing the rear end 28 thereof between the intermediate blades and then flexed downwardly to allow the coil 24 to pass the bolt 3. This reassembling also takes only a few seconds.

From the foregoing description it will be evident that the present invention involves a design of meat tenderizer which embodies but a few parts to thereby enable quick and easy disassembly and reassembly for cleaning purposes. The novel spring arrangement cooperates with the retaining means at each end of the blades to not only retain the stripper in place by urging the ends thereof downwardly into contact with the shoulders at each end of the blades, but also is sufficiently yieldable to permit a limited inward movement of the stripper, and thus allow it to perform its necessary function of stripping stray shreds of meat from the tines at the lower edges of the blades. It will be obvious that any suitable means could be provided other than that shown between the two intermediate blades against which the coil 24 of the spring may bear. It has been found more expedient to merely extend the shank 8 of the handle 7 for this purpose, but a separate block of material could be inserted therein if desired in which event the shank of the handle could terminate more nearly adjacent the rear end of the group of blades.

It has also been found that a meat tenderizer embodying the present invention can be manufactured much more economically than other similar devices, due primarily to the few parts and extreme simplicity.

Changes may be made in the form, construction and arrangement of parts from that disclosed herein without in any way departing from the spirit of the invention or sacrificing any of the attendant advantages thereof, provided, however, that such changes fall within the scope of the claims appended hereto.

The invention is hereby claimed as follows:

1. A meat tenderizer comprising a plurality of blades secured together in spaced relation, an elongated stripper having upwardly extending end portions movably mounted between said blades, retaining means at each end only of some of said blades to support the upwardly extending end portions of said stripper and limit the outward movement thereof, and yieldable means normally urging said stripper against said retaining means.

2. A meat tenderizer comprising a plurality of blades secured together in spaced relation, an elongated stripper movably mounted between said blades, shoulders at each end of some of said blades to support said stripper and limit the outward movement thereof, and yieldable means adapted to bear downwardly against said stripper only at each end thereof normally urging said stripper against said shoulders.

3. A meat tenderizer comprising a handle, a plurality of blades secured together in spaced relation and mounted on said handle, a stripper movably mounted between said blades and removable therefrom, shoulders at each end of some of said blades to support said stripper and normally limit the outward movement thereof, and removable spring means located between said blades bearing upwardly against said handle and normally urging said stripper against said shoulders, said stripper being removable from said blades upon removal of said spring means.

4. A meat tenderizer comprising a plurality of blades secured together in spaced relation, a stripper movably mounted between said blades and removable therefrom, shoulders at each end of some of said blades to support said stripper and normally limit the outward movement thereof, and removable spring means including a coil having outwardly extending end portions located between two of said blades, said end portions adapted to bear downwardly against the ends of said stripper to thereby urge said stripper outwardly against said shoulder, and said stripper being removable from said blades upon removal of said spring means.

5. A meat tenderizer comprising a plurality of blades secured together in spaced relation, a stripper movably mounted between said blades and including spaced bars having up-turned ends, means connecting together the up-turned ends at each end of said stripper, retaining means at each end of some of said blades against which the connecting means at each end of said stripper rest, to thereby support and limit the outward movement of said stripper, and removable yieldable means between two of said blades normally urging said stripper outwardly against said retaining means.

6. A meat tenderizer comprising a plurality of blades secured together in spaced relation, a stripper movably mounted between said blades and including spaced bars connected together at their ends, shoulders at each end of some of said blades adapted to support said stripper and limit the outward movement thereof, and removable spring means between two of said blades adapted to bear against one of the bars of said stripper, thereby urging said stripper outwardly against said shoulders, said stripper being removable from said blades upon the removal of said spring means.

7. A meat tenderizer comprising a plurality of blades secured together in spaced relation, a stripper movably mounted between said blades and including spaced bars connected together at their ends, shoulders at each end of some of said blades adapted to support said stripper and limit the outward movement thereof, and removable spring means including a coil having outwardly extending end portions located between two of said blades, said end portions adapted to bear against one of the bars of said stripper, thereby urging said stripper outwardly against said shoulders, said stripper being removable from said blades upon the removal of said spring means.

8. A meat tenderizer comprising a plurality of blades secured together in spaced relation, a stripper movably mounted between said blades and including spaced bars having up-turned ends, means connecting together the up-turned ends at each end of said stripper, shoulders at each end of some of said blades against which the connecting means at each end of said stripper rest, to thereby support and limit the outward movement of said stripper, and removable spring means located between two of said blades adapted to bear against one of the bars of said stripper, thereby urging said stripper outwardly against said shoulders, said stripper being freely removable from said blades upon the removal of said spring means.

9. A meat tenderizer comprising a plurality of blades secured together in spaced relation, a stripper movably mounted between said blades and including spaced bars having up-turned ends, means connecting together the up-turned ends at each end of said stripper, shoulders at each end of some of said blades against which the connecting means at each end of said stripper rest, to thereby support said stripper and limit the outward movement thereof, removable spring means located between two of said blades and including a coil having end portions extending outwardly therefrom in opposite directions, said end portions adapted to bear against said stripper, and means against which said coil is adapted to bear, whereby said stripper is normally urged outwardly against said shoulders but is free to move inwardly under pressure, said stripper being freely removable from said blades upon the removal of said spring means.

10. A meat tenderizer comprising a plurality of blades secured together in spaced relation, a stripper movably mounted between said blades and including spaced bars connected together at their ends, means at each end of some of said blades adapted to support said stripper and limit the outward movement thereof, and removable spring means between two of said blades adapted to bear against one of the bars of said stripper, thereby urging said stripper outwardly against said stripper supporting means, said stripper being removable from said blades upon the removal of said spring means.

11. A meat tenderizer comprising a plurality of blades secured together in spaced relation, a stripper movably mounted between said blades and including spaced bars connected together at their ends, means at each end of some of said blades adapted to support said stripper and limit the outward movement thereof, and removable spring means including a coil having outwardly extending end portions located between two of said blades, said end portions adapted to bear against a portion of said stripper, thereby urging said stripper outwardly against said stripper supporting means, said stripper being removable from said blades upon removal of said spring means.

RICHARD SYBENGA.

REFERENCES CITED

The following references are of record in the file of this patent:

UNITED STATES PATENTS

| Number | Name | Date |
| --- | --- | --- |
| 921,006 | Rubert et al. | May 11, 1909 |
| 1,421,458 | Gregory | July 4, 1922 |
| 2,109,434 | Oliver | Feb. 22, 1938 |
| 2,158,766 | Sybenga | May 16, 1939 |
| 2,184,450 | Elliott | Dec. 26, 1939 |